(12) United States Patent
Jung et al.

(10) Patent No.: US 9,655,148 B2
(45) Date of Patent: May 16, 2017

(54) METHOD FOR PROCESSING EMERGENCY CALL IN WIRELESS COMMUNICATION SYSTEM AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/889,803

(22) PCT Filed: May 9, 2014

(86) PCT No.: PCT/KR2014/004127
§ 371 (c)(1),
(2) Date: Nov. 6, 2015

(87) PCT Pub. No.: WO2014/182106
PCT Pub. Date: Nov. 13, 2014

(65) Prior Publication Data
US 2016/0119959 A1  Apr. 28, 2016

Related U.S. Application Data

(60) Provisional application No. 61/821,666, filed on May 9, 2013.

(51) Int. Cl.
*H04M 11/04* (2006.01)
*H04W 76/00* (2009.01)
(Continued)

(52) U.S. Cl.
CPC ......... *H04W 76/007* (2013.01); *H04W 24/04* (2013.01); *H04W 48/20* (2013.01);
(Continued)

(58) Field of Classification Search
CPC . H04W 76/028; H04W 76/007; H04W 48/20; H04W 24/04; H04W 76/023
(Continued)

(56) References Cited

U.S. PATENT DOCUMENTS 8,842,546 B2 * 9/2014 Chen .................. H04W 36/08
370/241
8,934,339 B2 * 1/2015 Suzuki .................. H04L 47/76
370/230
(Continued)

FOREIGN PATENT DOCUMENTS

KR  10-2011-0133500  12/2011
KR  10-2012-0033288  4/2012
(Continued)

OTHER PUBLICATIONS

PCT International Application No. PCT/KR2014/004127 Written Opinion of the International Searching Authority dated Aug. 19, 2014, 1 page.

*Primary Examiner* — Marceau Milord
(74) *Attorney, Agent, or Firm* — Lee Hong Degerman Kang & Waimey

(57) ABSTRACT

Provided are a method by which a terminal processes an emergency call in a wireless communication system, and an apparatus for supporting the same. The method comprises: selecting a cell when a radio link failure (RLF) is generated; transmitting a RRC connection re-establishment request message to the selected cell; stopping an expired timer if a suitable cell or a cell using different radio access technology (RAT) is not selected within a certain time when the RLF is (Continued)

generated in the emergency call process of the terminal and the selected cell is an acceptable cell; and transmitting the RRC connection reestablishment request message.

4 Claims, 12 Drawing Sheets

(51) Int. Cl.
  *H04W 24/04* (2009.01)
  *H04W 48/20* (2009.01)
  *H04W 76/02* (2009.01)
  *H04W 76/04* (2009.01)
(52) U.S. Cl.
  CPC ........ *H04W 76/028* (2013.01); *H04W 76/023* (2013.01); *H04W 76/046* (2013.01)
(58) Field of Classification Search
  USPC .......... 455/404.1, 423, 67.11, 436, 437, 442, 455/439
  See application file for complete search history.

(56) References Cited

U.S. PATENT DOCUMENTS

| | | | |
|---|---|---|---|
| 8,976,764 B2* | 3/2015 | Suzuki | H04L 1/1887 370/336 |
| 9,031,564 B2* | 5/2015 | Teyeb | H04W 36/0083 455/422.1 |
| 9,042,315 B2* | 5/2015 | Lin | H04W 36/30 370/242 |
| 9,049,698 B2* | 6/2015 | Johansson | H04W 76/027 |
| 9,131,411 B2* | 9/2015 | Won | H04W 36/0011 |
| 9,155,121 B2* | 10/2015 | Rayavarapu | H04W 76/028 |
| 9,198,093 B2* | 11/2015 | Olofsson | H04W 36/0005 |
| 9,215,628 B2* | 12/2015 | Xu | H04W 36/0033 |
| 9,232,418 B2* | 1/2016 | Lindoff | H04W 24/08 |
| 9,247,565 B2* | 1/2016 | Bostrom | H04W 24/10 |
| 9,247,575 B2* | 1/2016 | Rayavarapu | H04W 76/028 |
| 9,258,839 B2* | 2/2016 | Rayavarapu | H04W 76/028 |
| 9,265,086 B2* | 2/2016 | Wu | H04W 36/08 |
| 9,295,095 B2* | 3/2016 | Rayavarapu | H04W 76/046 |
| 9,319,917 B2* | 4/2016 | Tamura | H04W 24/10 |
| 9,326,192 B2* | 4/2016 | Han | |
| 9,338,700 B2* | 5/2016 | Schulist | H04W 36/0022 |
| 9,357,464 B2* | 5/2016 | Olofsson | H04W 36/0083 |

FOREIGN PATENT DOCUMENTS

| | | |
|---|---|---|
| KR | 10-2012-0080229 | 7/2012 |
| KR | 10-2012-0131223 | 12/2012 |
| WO | 2010/115155 | 10/2010 |
| WO | 2011/039636 | 4/2011 |

* cited by examiner

METHOD FOR PROCESSING EMERGENCY CALL IN WIRELESS COMMUNICATION SYSTEM AND APPARATUS FOR SUPPORTING SAME

CROSS-REFERENCE TO RELATED APPLICATIONS

This application is the National Stage filing under 35 U.S.C. 371 of International Application No. PCT/KR2014/004127, filed on May 9, 2014, which claims the benefit of U.S. Provisional Application No. 61/821,666, filed on May 9, 2013, the contents of which are all hereby incorporated by reference herein in their entirety.

BACKGROUND OF THE INVENTION

Field of the Invention

The present invention relates to wireless communications, and more particularly, to a method of processing an emergency call in a wireless communication system, and an apparatus supporting the method.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A user equipment (UE) which is a representative mobile device may experience a radio link failure (RLF) with respect to a network providing a wireless communication service. At the occurrence of the RLF, the UE performs a cell selection procedure for a radio resource control (RRC) connection re-establishment procedure. In the cell selection procedure, if the UE fails to select a suitable E-UTRA cell (hereinafter, a suitable cell) or a cell using another radio access technique (RAT) within a specific time, the UE transitions to an RRC-idle state.

Meanwhile, an emergency call is supported in a communication standard such as LTE/LTE-A or the like. In the conventional technique, however, if the UE performs an emergency call in an acceptable cell in which only a limited service can be received and if the RLF occurs in this process, since the UE transitions to the RRC-idle state when the UE fails to select the suitable cell or the cell using another RAT within the specific time, there is a problem in that the emergency call ends. There is a need for a method and apparatus for solving this problem.

SUMMARY OF THE INVENTION

The present invention provides a method of processing an emergency call in a wireless communication system, and an apparatus supporting the method.

In an aspect, provided is a method by which a user equipment processes an emergency call in a wireless communication system. the method comprising: selecting a cell when a radio link failure (RLF) occurs; and transmitting a radio resource control (RRC) connection re-establishment request message to the selected cell, wherein if the RLF occurs in the emergency call process of the user equipment and if the selected cell is an acceptable cell, a timer which expires when a suitable cell or a cell using another radio access technology (RAT) is not selected within a certain time stops, and the RRC connection re-establishment request message is transmitted.

In another aspect, provided is a wireless device comprising: a radio frequency (RF) unit for transmitting and receiving a radio signal; and a processor operatively coupled to the RF unit, wherein the processor is configured for: selecting a cell when a radio link failure (RLF) occurs; and transmitting a radio resource control (RRC) connection re-establishment request message to the selected cell, wherein if the RLF occurs in the emergency call process of the user equipment and if the selected cell is an acceptable cell, a timer which expires when a suitable cell or a cell using another radio access technology (RAT) is not selected within a certain time stops, and the RRC connection re-establishment request message is transmitted.

An emergency call can be prevented from unintentionally stopping even if a user equipment performs the emergency call in an acceptable cell.

DESCRIPTION OF EXEMPLARY EMBODIMENTS

Figure 1:
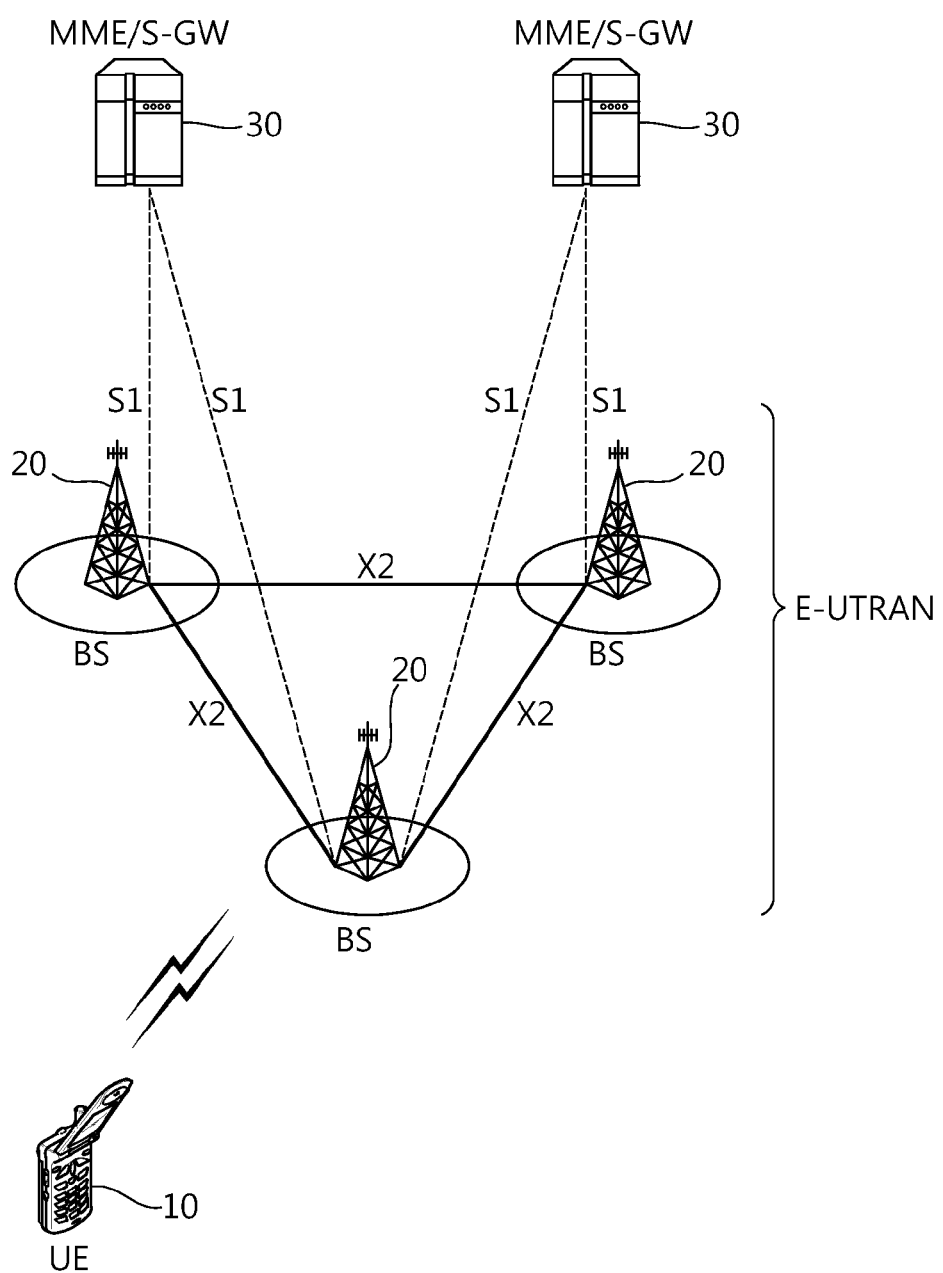
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
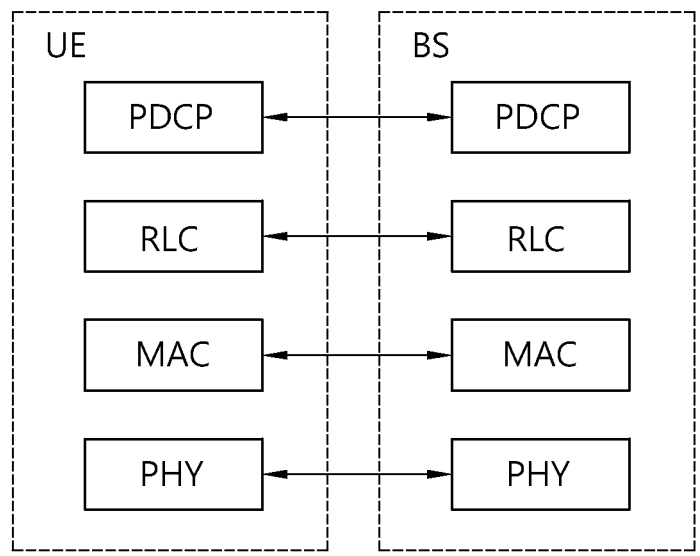
FIG. 2 is a block diagram illustrating a radio protocol architecture for a user plane.
Figure 3:
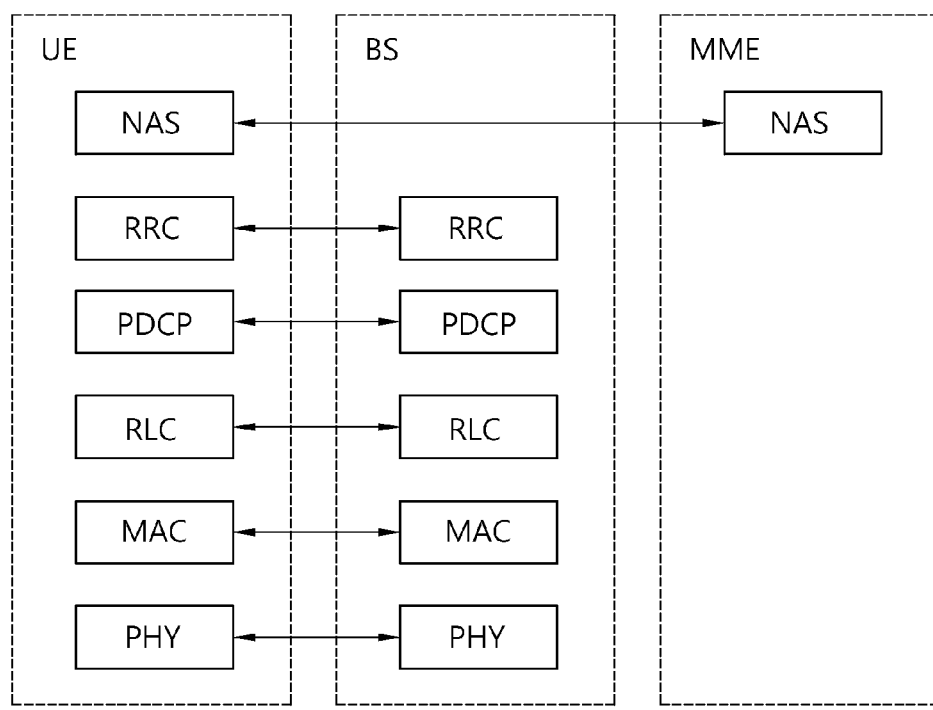
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

As disclosed in 3GPP TS 36.211 V8.7.0, the 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is classified into a master information block (MIB) and a plurality of system information blocks (SIBs).

The MIB may include a value indicating the number of parameters which are required to be acquired for other information from a cell and which are most essential and most frequently transmitted. The UE searches for the MIB first after downlink synchronization. The MIB may include information such as a downlink channel bandwidth, a PHICH configuration, an SFN supporting synchronization and operating based on timing, and an eNB transmission antenna configuration. The MIB may be transmitted on a BCH in a broadcasting manner.

Among the included SIBs, SystemInformationBlockType1 (SIB1) is transmitted by being included in a "SystemInformationBlockType1" message, and SIBs other than the SIB1 are transmitted by being included in a system information message. Mapping of the SIBs to the system information message may be flexibly configured by a scheduling information list parameter included in the SIB1. However, each SIB may be included in a single system information message, and only SIBs having the same scheduling requirement value (e.g., a period) may be mapped to the same system information message. In addition, SystemInformationBlockTape2 (SIB2) is always mapped to a system information message corresponding to a first entry in a system information message list of a scheduling information list. A plurality of system information messages may be transmitted within the same period. The SIB1 and all system information messages are transmitted on a DL-SCH.

In addition to broadcasting transmission, an E-UTRAN may be dedicated-signaled in a state where the SIB1 includes a parameter determined to be the same as a predetermined value. In this case, the SIB1 may be transmitted by being included in an RRC connection reconfiguration message.

The SIB1 includes information related to UE's cell access, and defines scheduling of other SIBs. The SIB1 may include PLMN identities of a network, a tracking area code (TAC), a cell ID, a cell barring status indicating whether a cell is a camp-on available cell, a minimum reception level required in a cell used as a cell reselection criterion, and information related to a transmission time and period of other SIBs.

The SIB2 may include radio resource configuration information which is common to all UEs. The SIB2 may include information related to an uplink carrier frequency and uplink channel bandwidth, an RACH configuration, a paging configuration, an uplink power control configuration, a sounding reference signal configuration, and an ACK/NACK transmission supportive PUCCH configuration and PUSCH configuration.

The UE may apply a system information acquisition and change detection procedure only to a primary cell (PCell). In a secondary cell (SCell), the E-UTRAN may provide all system information related to an RRC-connected state operation through dedicated signaling when the SCell is added. When the system information related to the configured SCell is changed, the E-UTRAN may release an SCell to be considered and may add it at a later time. This may be performed together with a single RRC-connected reconfiguration message. The E-UTRAN may configure a value which has been broadcast in the SCell and other parameter values through the designated signaling.

As to specific type system information, the UE needs to guarantee its validity. Such system information is called required system information. The required system information may be defined as follows.

When the UE is in an RRC-idle state: It shall be guaranteed that the UE has a valid version of not only SIB1 to SIB8 but also MIB and SIB1. This may be based on the support of an RAT to be considered.

When the UE is in an RRC-connected state: It shall be guaranteed that the UE has a valid version of MIB, SIB1, and SIB2.

In general, the validity of the system information may be guaranteed up to 3 hours after acquisition.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
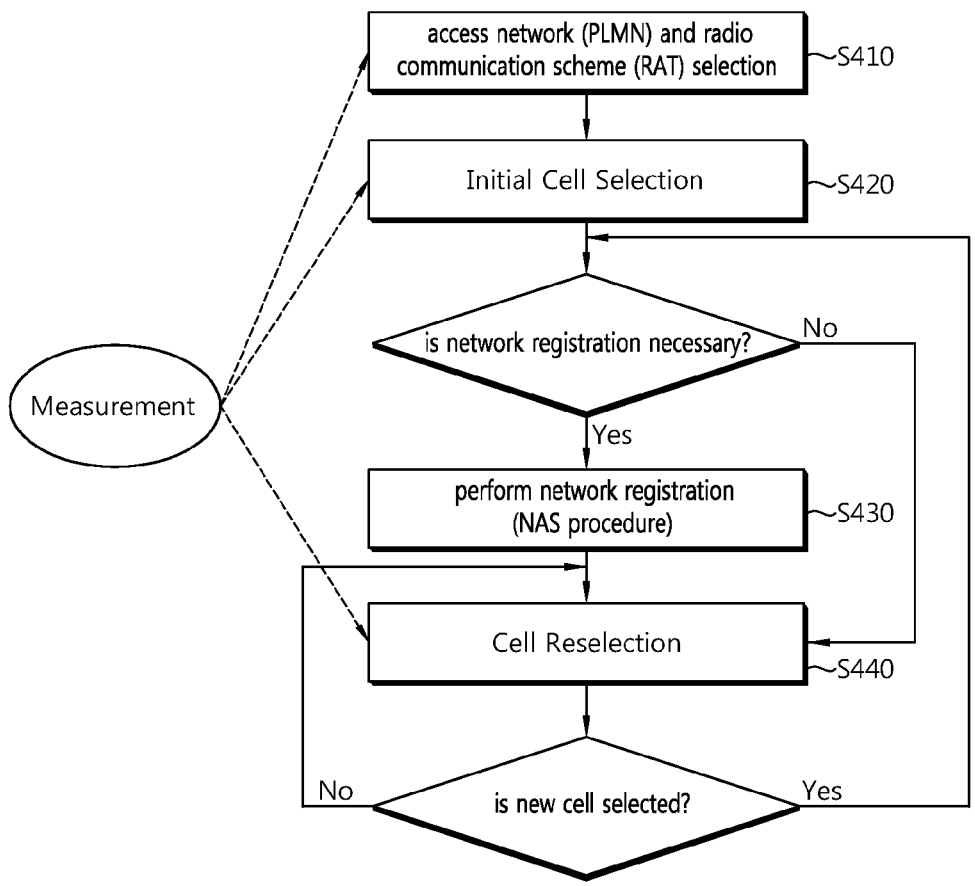
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
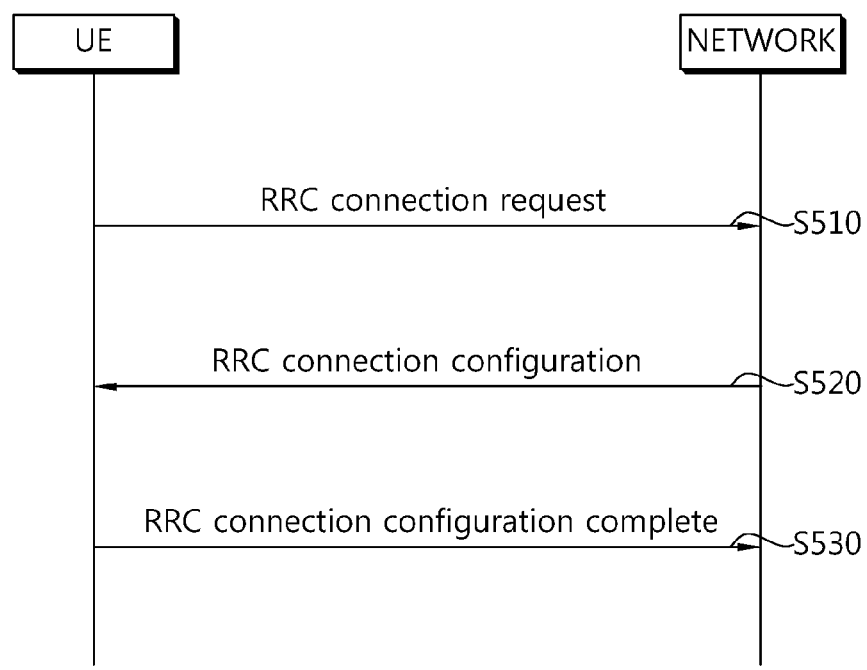
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
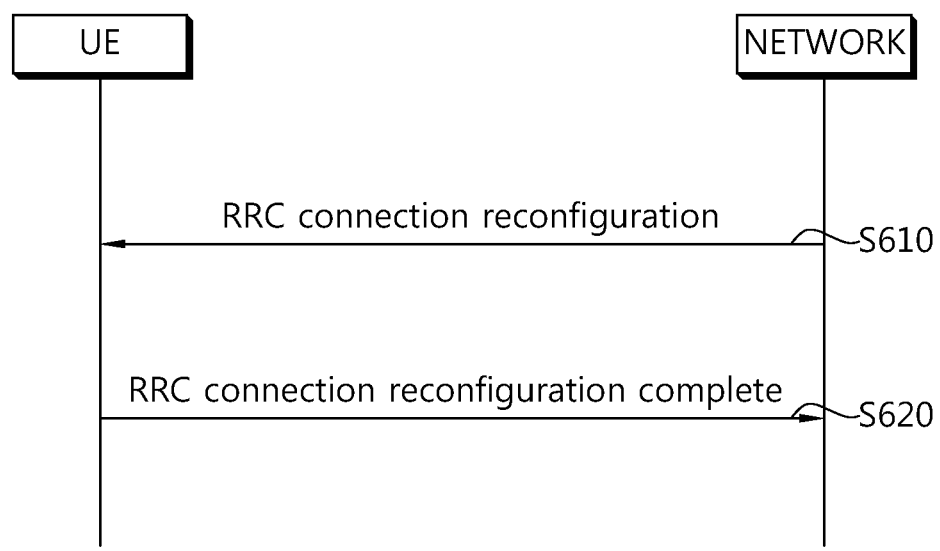
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/ modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

The quality of cells may be applied as a most important factor when performing the cell reselection. If a reselected cell is not a suitable cell, the UE excludes the reselected cell or a frequency of the reselected cell from targets of the cell reselection.

When the UE performs the cell reselection according to the cell reselection evaluation, if the cell reselection criterion is satisfied during a specific time period, the UE may determine that the cell reselection criterion is satisfied and may perform cell movement to a target cell. Herein, the specific time may be given from a network as a parameter $T_{reselection}$. $T_{reselection}$ may specify a cell reselection timer value, and may be defined for each frequency of E-UTRAN and for a different RAT.

The cell reselection information may be provided to the UE by being included in an RRC connection release message which is an RRC message transmitted for releasing an RRC connection between the network and the UE. For example, the RRC connection release message may include a subcarrier frequency list and cell reselection priority of E-UTRAN, a subcarrier frequency list and cell reselection priority of UTRA-FDD, a subcarrier frequency list and cell reselection priority of UTRA-TDD, a subcarrier frequency list and cell reselection priority of GERAN, a band class list and cell reselection priority of CDMA2000 HRPD, a band class list and cell reselection priority of CDMA2000 1×RTT, etc.

Hereinafter, RAN sharing by a plurality of operators will be described.

The plurality of operators may provide a service by individually implementing an RAN, and may provide a service to a subscriber by sharing a cell implemented by a specific operator. This is called RAN sharing. In this case, a cell shared by the plurality of operators may broadcast a PLMN list. The PLMN list may be transmitted by being included in SIB1 of system information which is broadcast by the cell. Meanwhile, it may be implemented such that a PLMN identifier which is first enumerated in the PLMN list included in the SIB1 indicates a primary PLMN.

In a situation where one cell is shared by the plurality of operators, cell reselection information provided by the shared cell may be commonly applied to all PLMNs in the PLMN list. In general, the cell reselection information provided by the shared cell is configured to primarily conform to a policy of the primary PLMN. Therefore, UEs to which a service based on a secondary PLMN is provided performs cell reselection based on information other than cell reselection information optimized to provide a service.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 7:
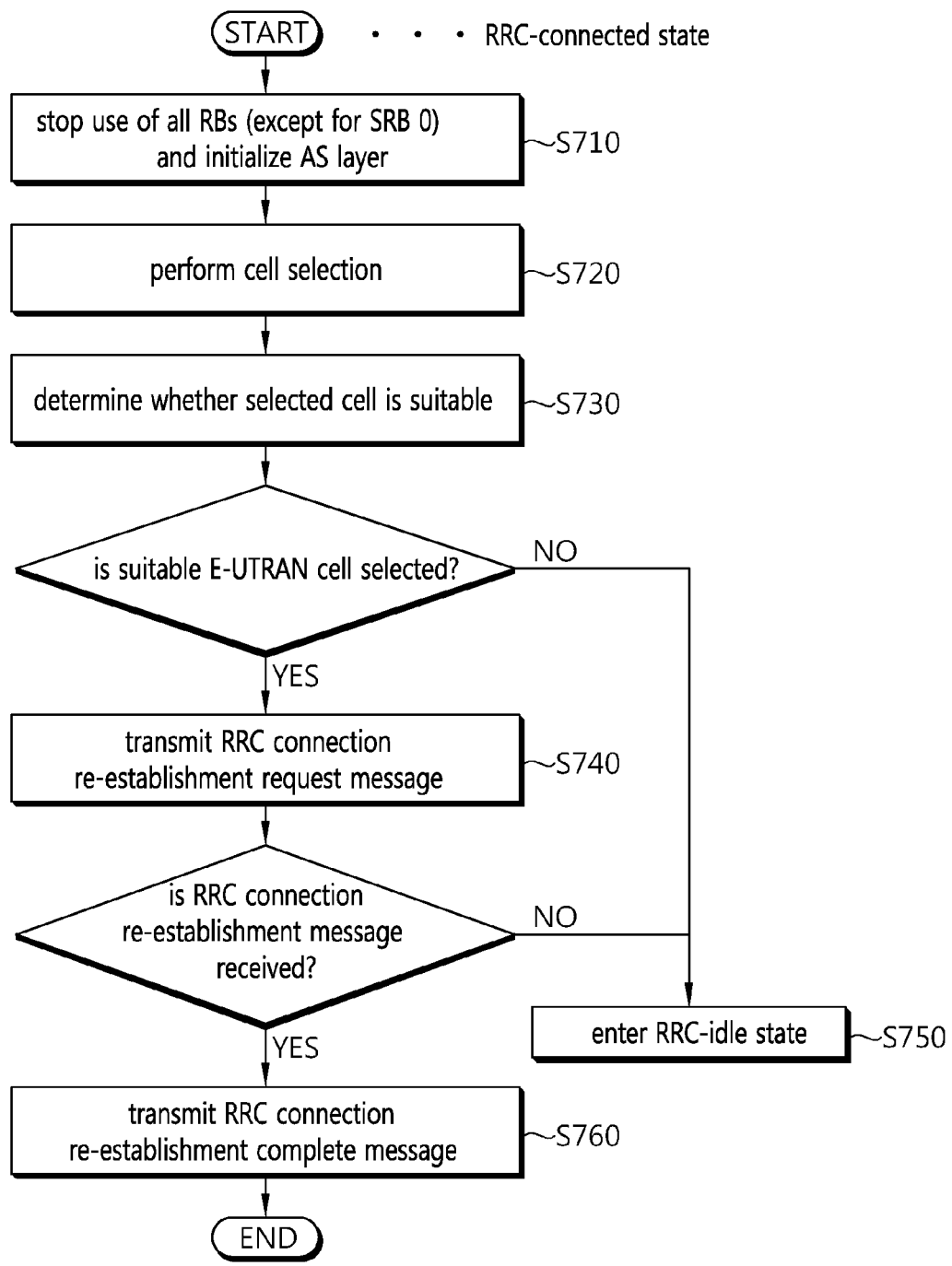
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Now, the present invention is described.

Figure 8:
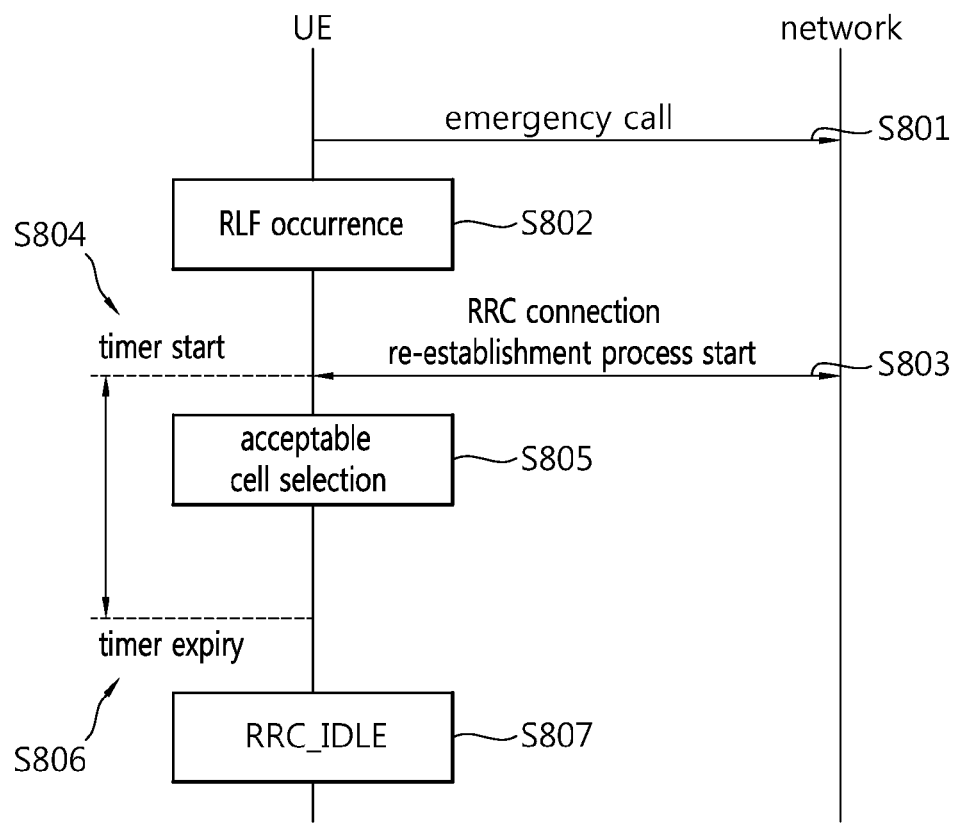
FIG. 8 shows a problem of processing an emergency call according to the conventional technique.

FIG. 8 shows a problem of processing an emergency call according to the conventional technique.

Referring to FIG. 8, a UE may perform an emergency call to a network (S801). The UE may perform the emergency call in an acceptable cell.

In the emergency call process of the UE, a radio link failure (RLF) may occur between the UE and a network (S802).

At the occurrence of the RLF, the UE starts an RRC connection re-establishment process with respect to the network (S803). The RRC connection re-establishment process has been described above with reference to FIG. 7.

When the RRC connection re-establishment process starts, a timer starts (S804). The following table shows an example of timers according to the conventional technique.

TABLE 1

| Timer | Start | Stop | At expiry |
|---|---|---|---|
| T300 | Transmit RRC connection request message | Receive RRC connection configuration or RRC connection reject message | MAC reset, connection establishment failure information preservation, etc. |
| T301 | Transmit RRC connection re-establishment message | When RRC connection re-establishment message or RRC connection re-establishment reject message is received or when selected cell is not suitable | Enter RRC-idle state |
| T311 | Start RRC connection re-establishment process | Select suitable cell or cell using another RAT | Enter RRC-idle state |

The timer in the step S804 may be, for example, T311. That is, the timer starts when the RRC connection re-establishment process starts, and is a timer which stops when a suitable cell or a cell using another RAT is selected. The timer expires when the UE fails to select the suitable cell or the cell using another RAT within a specific time. In this case, the UE transitions to an RRC-idle state.

The UE may select an acceptable cell before the expire of the timer (S805). As described above, since the timer stops when the UE selects the suitable cell or the cell using another RAT, even if the UE selects the acceptable cell, the timer does not stop and eventually expires (S806). As a result, the UE transitions to the RRC-idle state (S807). According to such a conventional technique, since the UE which has transmitted the emergency call transitions to the RRC-idle state, there is a problem in that the emergency call transmitted by the UE ends.

Hereinafter, a method capable of solving the aforementioned emergency call ending problem is described.

Figure 9:
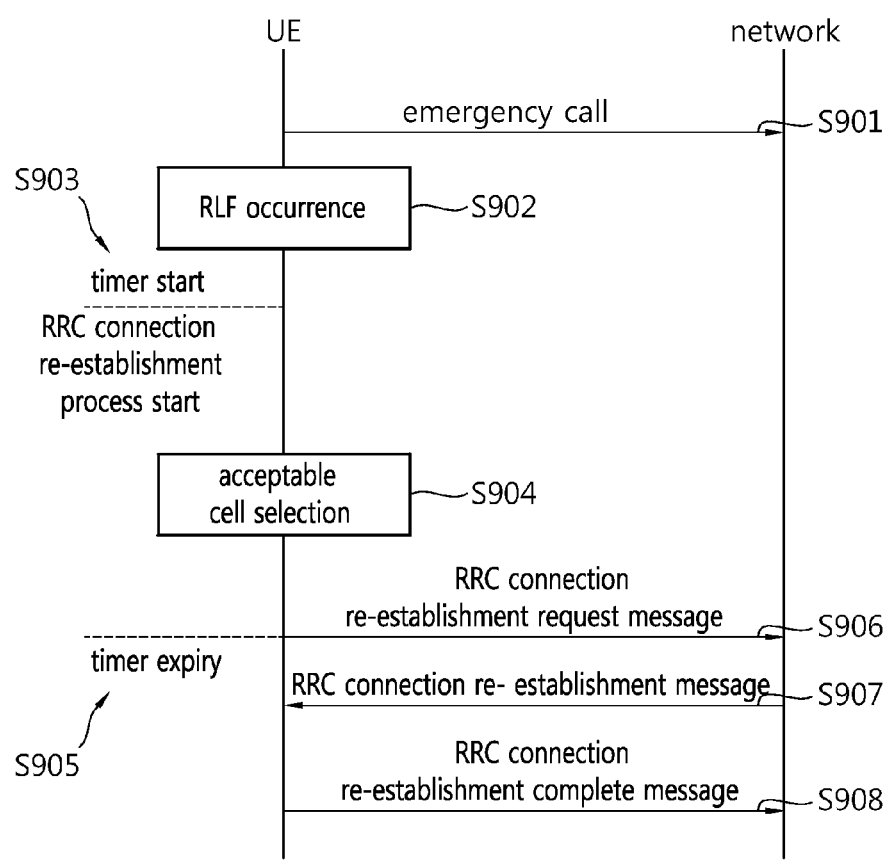
FIG. 9 shows a method of processing an emergency call according to an embodiment of the present invention.

FIG. 9 shows a method of processing an emergency call according to an embodiment of the present invention.

Referring to FIG. 9, a UE transmits the emergency call (S901).

If an RLF occurs in the emergency call process (S902), the UE starts an RRC connection re-establishment process. In this case, a timer (e.g., T311) starts (S903). The timer expires when the UE fails to select a suitable cell or a cell using another RAT within a specific time, and in this case, may be a timer by which the UE transitions to an RRC-idle state.

The UE may select an acceptable cell in an RRC connection re-establishment process (S904).

Then, the UE stops the timer (S905), and transmits an RRC connection re-establishment request message to a network (S906). When the RRC connection re-establishment message is received (S907), the UE transmits an RRC connection re-establishment complete message to the network (S908).

In the method described with reference to FIG. 9, the timer starts when the RRC connection re-establishment process starts, but unlike the conventional technique, the timer stops even if the acceptable cell is selected during the emergency call process of the UE, instead of stopping the timer by selecting the suitable cell or the cell using another RAT. As a result, the UE does not transition to the RRC-idle mode even if the acceptable cell is selected in the emergency call process.

Meanwhile, the emergency call process of the UE is premised in FIG. 9. In case of a process in which the UE performs not the emergency call but a normal call (hereinafter, a non-emergency call), the timer may not stop but operate similarly to the conventional case if the UE selects an acceptable cell in an RRC connection re-establishment process.

Hereinafter, a method of processing a normal RLF is described without being limited to the emergency call.

Figure 10:
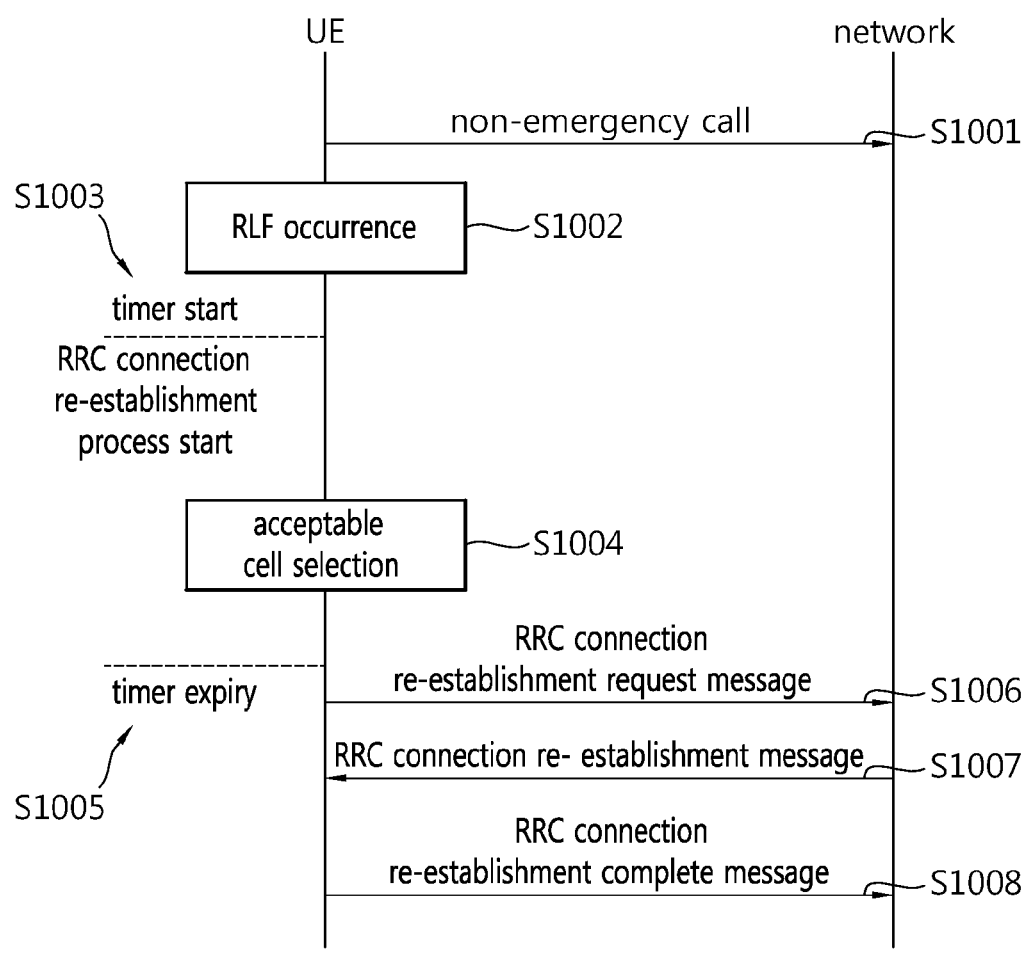
FIG. 10 shows a method of processing an RLF according to another exemplary embodiment of the present invention.

FIG. 10 shows a method of processing an RLF according to another exemplary embodiment of the present invention.

Referring to FIG. 10, a UE transmits a non-emergency call (S1001).

If the RLF occurs in the non-emergency call process (S1002), the UE starts an RRC connection re-establishment process. In this case, a timer starts (S1003).

The UE may select an acceptable cell in the RRC connection re-establishment process (S1004).

In this method, the timer does not stop but continues to run and then expires when the acceptable cell is selected (S1005).

In the conventional technique, when the timer expires, the UE transitions to the RRC-idle state. However, in the present invention, in the above case, the UE does not transition to the RRC-idle state but transmits an RRC connection re-establishment request message to the network (S1006). When the RRC connection re-establishment message is received (S1007), the UE transmits an RRC connection re-establishment complete message to the network (S1008).

Although a case where the UE transmits the non-emergency call is exemplified in FIG. 10, the method is not limited thereto. That is, the method may also equally apply to a case where the UE transmits the emergency call in the step S1001. Alternatively, the method proposed in FIG. 10 may apply only when the UE transmits the emergency call in the step S1001, and the conventional method may be used in case of the non-emergency call.

Figure 11:
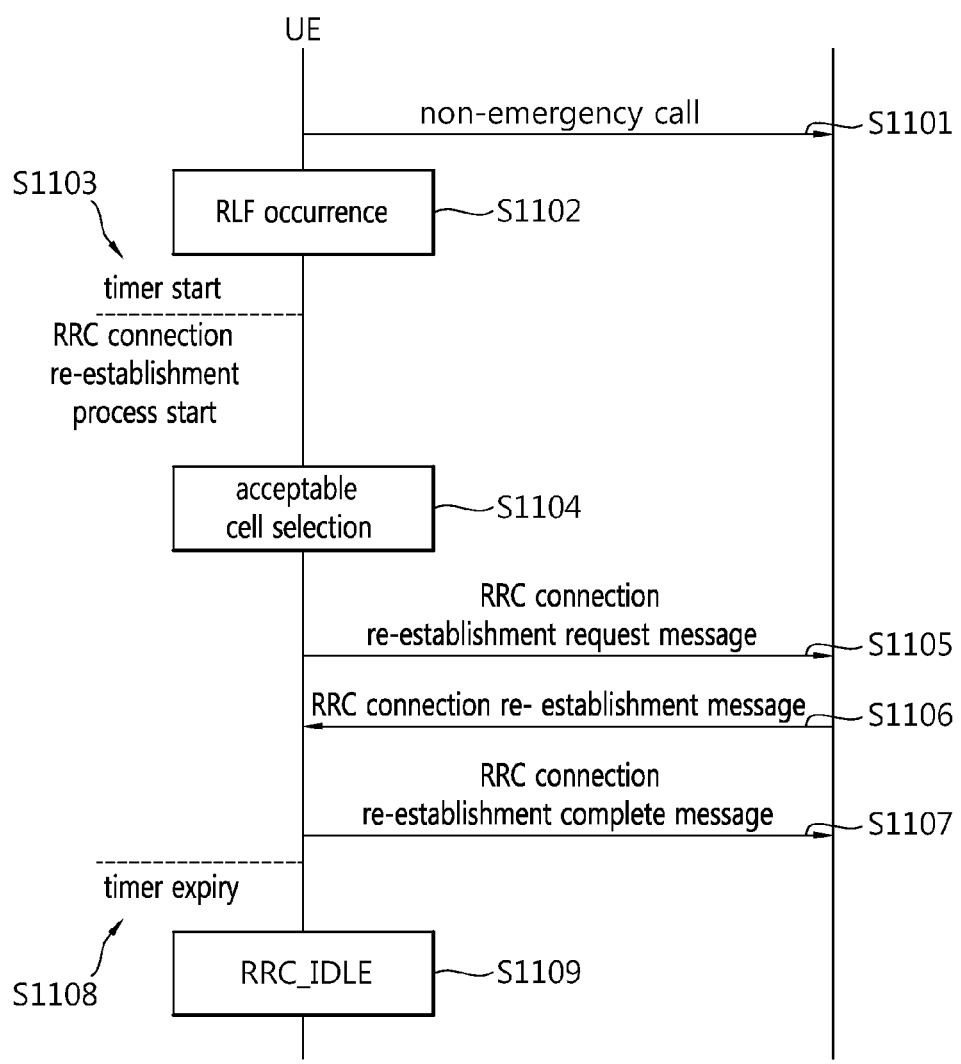
FIG. 11 shows a method of processing an RLF according to another embodiment of the present invention.

FIG. 11 shows a method of processing an RLF according to another embodiment of the present invention.

Referring to FIG. 11, a UE transmits a non-emergency call (S1101).

If the RLF occurs in the non-emergency call process (S1102), the UE starts an RRC connection re-establishment process. In this case, a timer starts (S1103).

The UE may select an acceptable cell in an RRC connection re-establishment process (S1104).

When the UE selects the acceptable cell, the UE does not stop the timer and transmits an RRC connection re-establishment request message to a network (S1105). When the RRC connection re-establishment message is received (S1106), the UE transmits an RRC connection re-establishment complete message to the network (S1107).

Meanwhile, if the timer expires (S1108), the UE transitions to the RRC-idle state (S1109). Herein, the timer may stop under the condition of receiving the RRC connection re-establishment message. Therefore, the timer may expire when the RRC connection re-establishment message is not received.

Although a case where the UE transmits the non-emergency call is exemplified in FIG. 11, the method is not limited thereto. That is, the method may also equally apply to a case where the UE transmits the emergency call in the step S1101. Alternatively, the method proposed in FIG. 11 may apply only when the UE transmits the emergency call in the step S1101, and the conventional method may be used in case of the non-emergency call.

In addition, the methods described with reference to FIG. 10 and FIG. 11 may be used in combination of FIG. 9. That is, the methods may be used in combination such that the method of FIG. 9 is used in the emergency call process of the UE and the method of FIG. 10 or FIG. 11 is used in the non-emergency call process of the UE. Alternatively, any one of the methods of FIG. 9, FIG. 10, and FIG. 11 may be used in the emergency call process of the UE. In this case, the conventional method may be used in the non-emergency call process.

Figure 12:
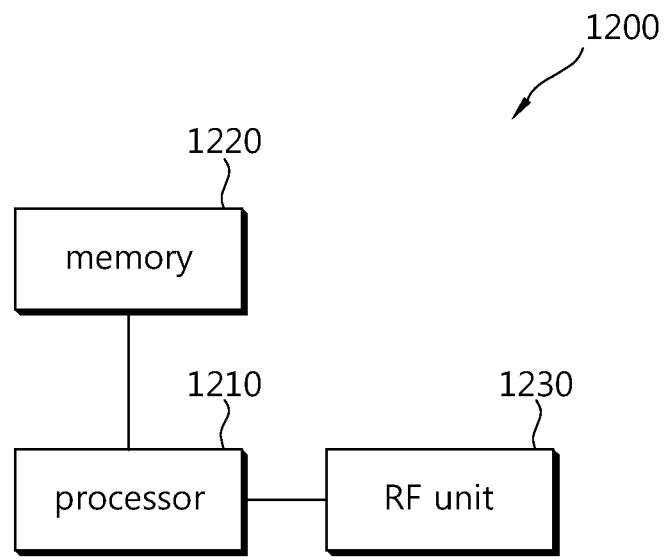
FIG. 12 is a block diagram showing a wireless device according to an embodiment of the present invention.

FIG. 12 is a block diagram showing a wireless device according to an embodiment of the present invention. This device may be implemented by using a UE or a network system for performing a method of processing an emergency call and a method of processing an RLF according to the embodiment of the present invention.

Referring to FIG. 12, a wireless device 1200 includes a processor 1210, a memory 1220, and a radio frequency (RF) unit 1230. The processor 1210 implements the proposed functions, procedures, and/or methods. The processor 1210 may be configured to perform the aforementioned embodiment of the present invention described with reference to FIG. 9 to FIG. 11.

The RF unit 1230 coupled to the processor 1210 transmits and receives a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for performing a radio resource control (RRC) connection re-establishment by a user equipment (UE) in a wireless communication system, the method comprising:
    transmitting a call which is one of an emergency call or a non-emergency call;
    detecting an occurrence of a radio link failure (RLF);
    starting a timer when the occurrence of the RLF is detected, wherein the timer expires when a suitable cell or a cell using another radio access technology (RAT) is not selected within a certain time, wherein the suitable cell or the cell using another RAT is different from an acceptable cell in which the UE receives a limited service;
    selecting the acceptable cell while the timer is running; and
    performing the RRC connection re-establishment with the acceptable cell based on a type of the call and a state of the timer,
    wherein if the occurrence of the RLF is detected after a transmission of the emergency call, the timer stops and the RRC connection re-establishment is performed after a stop of the timer, and
    if the occurrence of the RLF is detected after a transmission of the non-emergency call, the timer does not stop and the RRC connection re-establishment is performed after the timer expires.

2. The method of claim 1, wherein the performing the RRC connection re-establishment includes:
    transmitting, to the acceptable cell, a RRC connection re-establishment request message;
    receiving, from the acceptable cell, an RRC connection re-establishment message in response to the RRC connection re-establishment request message; and
    transmitting, to the acceptable cell, an RRC connection re-establishment complete message in response to the RRC connection re-establishment message.

3. A user equipment (UE) comprising:
    a radio frequency (RF) unit that transmits and receives a radio signal; and
    a processor operatively coupled to the RF unit,
    wherein the processor that:
    transmits a call which is one of an emergency call or a non-emergency call,
    detects an occurrence of a radio link failure (RLF),
    starts a timer when the occurrence of the RLF is detected, wherein the timer expires when a suitable cell or a cell using another radio access technology (RAT) is not selected within a certain time, wherein the suitable cell or the cell using another RAT is different from an acceptable cell in which the UE receives a limited service,
    selects the acceptable cell while the timer is running; and
    performs the RRC connection re-establishment with the acceptable cell based on a type of the call and a state of the timer,
    wherein if the occurrence of the RLF is detected after a transmission of the emergency call, the timer stops and the RRC connection re-establishment is performed after a stop of the timer, and
    if the occurrence of the RLF is detected after a transmission of the non-emergency call, the timer does not stop and the RRC connection re-establishment is performed after the timer expires.

4. The UE of claim 3, wherein the processor that performs the RRC connection re-establishment further includes that:
    transmits, to the acceptable cell, a RRC connection re-establishment request message,
    receives, from the acceptable cell, an RRC connection re-establishment message in response to the RRC connection re-establishment request message; and
    transmits, to the acceptable cell, an RRC connection re-establishment complete message in response to the RRC connection re-establishment message.

* * * * *